Oct. 11, 1960　　E. V. BERGSTROM ET AL　　2,956,009
HYDROCARBON CONVERSION PROCESS AND APPARATUS
Filed Jan. 11, 1957　　　　　　　　　　　　6 Sheets-Sheet 3

INVENTORS
Eric V. Bergstrom
BY　Joe E. Penick

Andrew L. Jaborault
AGENT

Oct. 11, 1960 E. V. BERGSTROM ET AL 2,956,009
HYDROCARBON CONVERSION PROCESS AND APPARATUS
Filed Jan. 11, 1957 6 Sheets-Sheet 5

INVENTORS
Eric V. Bergstrom
BY Joe E. Penick

Andrew L. Gaboriault
AGENT

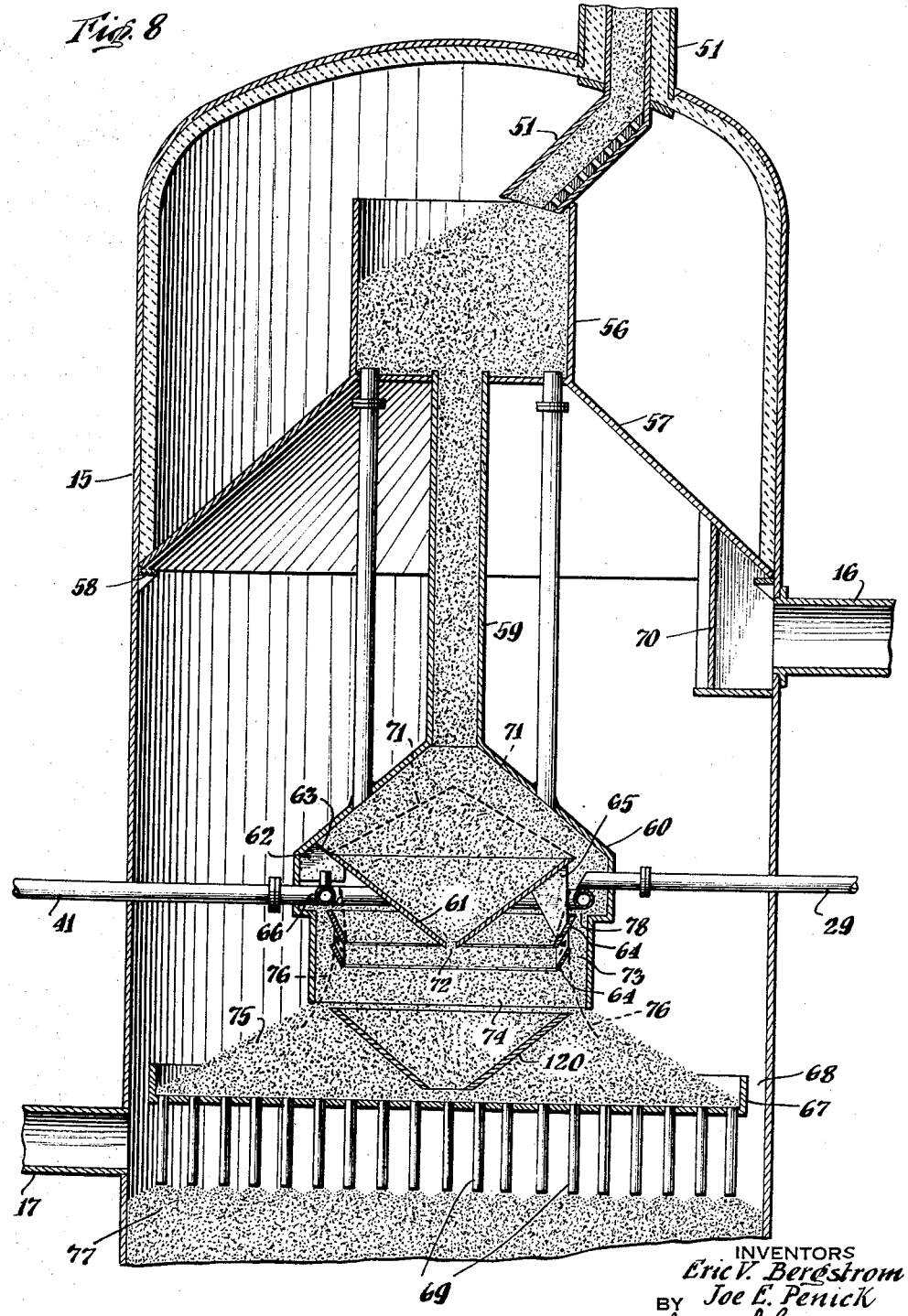

United States Patent Office 2,956,009
Patented Oct. 11, 1960

2,956,009

HYDROCARBON CONVERSION PROCESS AND APPARATUS

Eric V. Bergstrom, Short Hills, and Joe E. Penick, Glen Rock, N.J., assignors to Socony Mobil Oil Company, a corporation of New York Filed Jan. 11, 1957, Ser. No. 633,623

13 Claims. (Cl. 208—166)

This application is a continuation-in-part of application Serial Number 311,286, filed September 24, 1952, now abandoned.

The invention defined herein has to do with a method and apparatus for the conversion of fluid hydrocarbons in the presence of a moving granular contact material mass which may or may not exhibit catalytic properties with respect to the conversion reaction. Particularly, this invention is concerned with a method and apparatus for the introduction of a liquid hydrocarbon charge to the conversion zone of processes wherein the granular contact material passes cyclically through successive zones or vessels, in the first of which it is contacted with a liquid or mixed phase charge to effect the conversion thereof, and in the second of which the contact material is reconditioned for re-use in the first zone.

Typical of processes to which this invention may be applied is the catalytic conversion of high boiling liquid or mixed phase hydrocarbons to lower boiling, gasoline-containing hydrocarbons, by contacting the hydrocarbon charge at temperatures of the order of 850° F. and upwards, with a moving bed of granular adsorbent catalytic material. Other exemplary processes include the catalytic dehydrogenation, polymerization, isomerization, alkylation, hydrocracking, and the like, of liquid or mixed phase hydrocarbons using an adsorbent catalytic solid and the thermal coking, cracking, visbreaking, and the like, of liquid or mixed phase hydrocarbons in the presence of a granular inert material.

In such processes wherein the contact material is catalytic in nature, it may partake of the nature, for example, of natural or treated clays, bauxite, activated alumina, or synthetic associations of silica, alumina or magnesia or combinations thereof, to which certain metals or metallic oxides may be added in small amounts for specific purposes. When the contact material is inert in character, it may partake of the form of refractory materials, such as zirkite, corhart material or mullite or particles of quartz, fused alumina or coke, or it may partake of the form of stones or metallic particles or balls.

The contact material should be of palpable particulate form, as distinguished from finely divided powders, and may take the shape of pellets, tablets, spheres, capsules, and the like, or particles of irregular shape such as are obtained from grinding and screening operations. Generally, the contact material should be within the size range about 1 inch to 100 mesh, and preferably 4 to 20 mesh by Tyler Standard Screen Analysis. The term "granular" as used herein in describing and claiming this invention should be understood to include any contact material of the above forms and sizes, whether of regular or irregular shape.

In conversion systems of the aforementioned types it is frequently desired to effect the conversion of a hydrocarbon material, a substantial part of which will not vaporize below its thermal decomposition temperature. This makes it necessary to supply at least a part of the material to the conversion zone and the reaction bed of contact material therein as a liquid rather than a vapor. The introduction of this liquid hydrocarbon charge to the conversion zone presents certain special problems.

First, it is necessary to distribute the liquid charge substantially uniformly over at least a substantial portion of the contact material supplying the downwardly moving reaction bed, so that liquid charge will be distributed substantially uniformly over the reaction bed cross-section. A non-uniform distribution results in the liquid channeling through the reaction bed, which in turn results in a non-uniform conversion of the liquid charge with under-conversion in the areas of high liquid charge concentration and over-conversion in the areas of low liquid charge concentration.

Second, the liquid charge must be supplied in such a manner that contact between the liquid and hot metal parts in the conversion chamber is minimized. As previously stated, the liquid charge must be introduced at a temperature below its thermal decomposition temperature. However, the most desirable conversion temperature is normally above the thermal decomposition temperature. Therefore, the heat necessary to raise the temperture of the charge from the level of its introduction to the conversion temperature usually must be supplied by the fresh contact material. Thus, contact material will be supplied to the conversion chamber at temperatures well in excess of the thermal decomposition temperature of the liquid, and most metal parts of the conversion chamber will also be above the liquid decomposition temperature due to heat transfer from the contact material. If liquid charge contacts any of these hot metal parts, it immediately undergoes conversion to a vapor hydrocarbon and leaves a coke deposit on the metal surface. Unless this coke is continuously scrubbed from these surfaces, it will build up and break off in large pieces which will plug up the restricted openings in the lower section of the conversion vessel and elsewhere in the cyclic system.

A further factor to reckon with in the development of a workable liquid feed system is the additional pressure drop across the reactor that the system will impose. Higher pressure drops require higher pressures in the upper end of the reactor and, therefore, longer contact material feed legs to feed solids to the reactor. Additional feed leg length, of course, means an addition of height to the unit structure and increased expense.

A major object of this invention is to provide a method and apparatus for supplying liquid or mixed phase hydrocarbon charge to the conversion zone of processes employing a moving mass of granular contact material which overcomes the above-described difficulties.

Another object of this invention is to provide a method and apparatus for the conversion of liquid and mixed phase hydrocarbon charges uniformly to gaseous products without excessive accumulation of coke on hot metal parts within the conversion zone of the process.

Another object of this invention is to provide a method and apparatus for the uniform conversion of a fluid hydrocarbon charge which must be supplied to the conversion zone partially as a liquid and partially as a vapor.

These and other objects will be apparent from the following discussion of the invention.

Before proceeding with this discussion certain terms used in describing and claiming this invention will be defined. The term "gaseous" is used herein to refer to a material in the gaseous phase under the existing conditions of temperature and pressure, regardless of what may be the normal state of the material under atmospheric conditions. Similarly, "liquid" refers to a material in the liquid phase under existing conditions, regardless of its normal state. The terms "annular" and "annular-shaped" are used herein to refer to passages or members of the shape of the space defined between two members of the same or different shapes but of different lateral dimensions, with the smaller member placed symmetrically within the larger, regardless of whether such space is ring-shaped or not.

In the process of this invention contact material is supplied to a downwardly gravitating, substantially compact reaction bed of contact material as a substantially compact stream of contact material of substantially less cross-section than said bed. Within the stream is maintained a high velocity region of contact material flow and a substantially lower velocity region of contact material flow. Liquid hydrocarbon charge is injected only into the high velocity region and any vapors formed therein are permitted to expand into the lower velocity region. Hydrocarbons are then passed with the stream of contact material into the reaction bed.

This invention will be best understood by referring to the attached drawings, of which—

Figure 8 is an elevational view, partially in section, of the upper section of a reaction vessel employing another modified form of this invention.

All of these drawings are diagrammatic in form and like parts in all bear like numerals.

Figure 1:
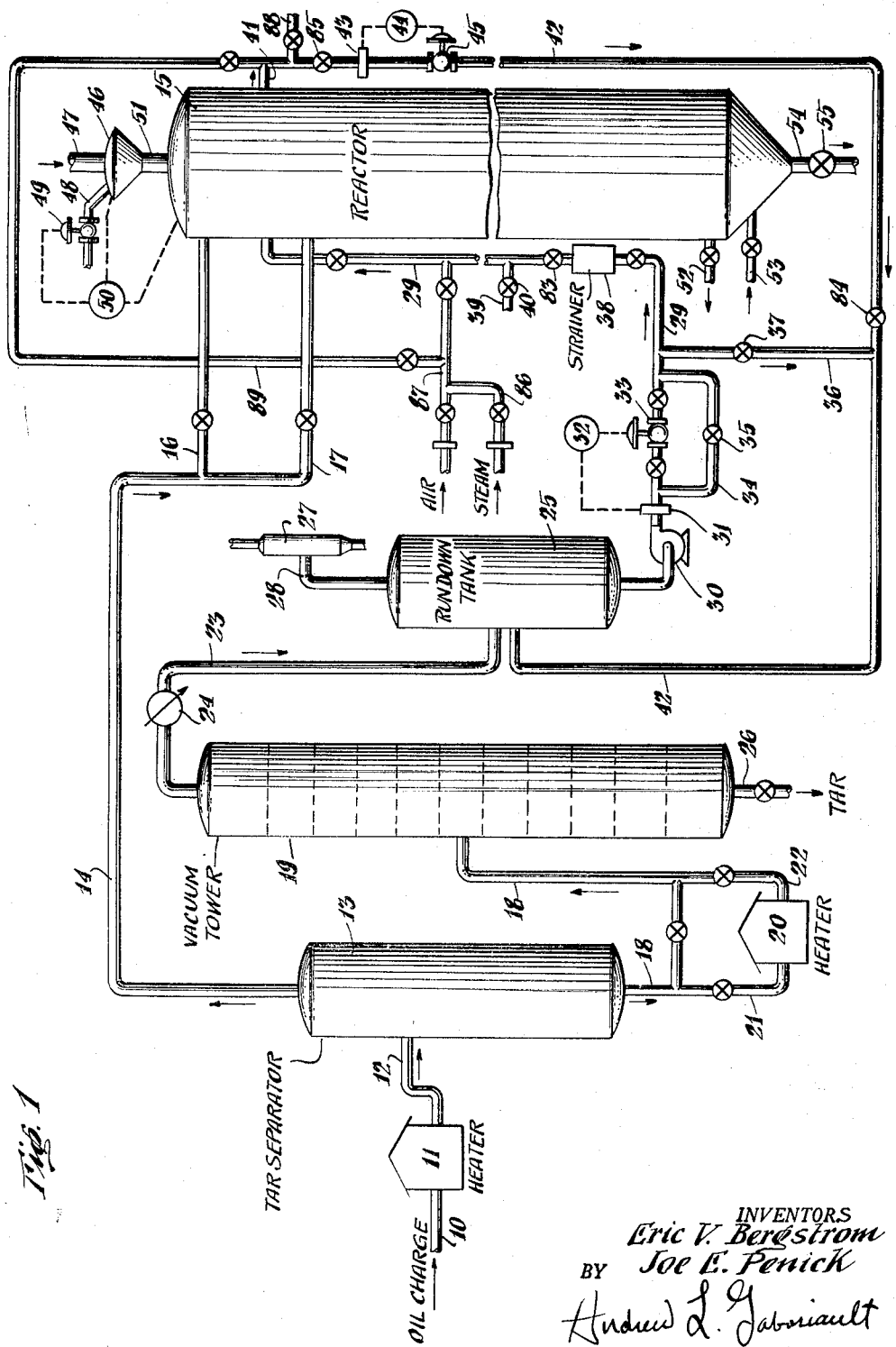
Figure 1 is an elevational view illustrating the charge preparation system and reactor of a catalytic conversion system to which this invention may be applied.

Turning now to Figure 1, there is shown therein the process for charging a reduced crude charge to a catalytic hydrocarbon reactor. Reduced crude charge stocks contain heavy residual materials, such as tars, asphalts, salts, and the like, which it is undesirable to pass into the hydrocarbon conversion zone. In Figure 1, the reduced crude charge is passed by means of a conduit 10, through a furnace or other heater 11, wherein the charge is heated to a temperature below the temperature where thermal decomposition begins but sufficient to vaporize substantially all of the hydrocarbons therein which will vaporize below the thermal decomposition temperature. The heated charge is then passed through a conduit 12 into a tar or phase separator 13. In separator 13 the vaporized hydrocarbons pass overhead and are removed through conduit 14. The vaporized hydrocarbons are supplied to a hydrocarbon converter or reactor 15 as a vaporized hydrocarbon charge. This vaporized charge may be supplied to the reactor at either of two alternate levels, as is described hereinbelow, through conduit 16 or conduit 17 extending from conduit 14. The pressure in separator 13 must be sufficient to force the vaporized charge from the separator into the reactor. For normal commercial installation about 10 to 15 pounds per square inch gauge is adequate.

The separator bottoms which contain the heavier hydrocarbons, plus the tar, are removed from separator 13 through conduit 18 and passed thereby into vacuum distillation tower 19. If desired, a portion or all of the separator bottoms may be heated before entry to the vacuum tower by by-passing all or a portion through heater 20 via pipes 21 and 22. The pressure in the vacuum tower 19 is maintained at a sufficiently low level to effect vaporization of most of the heavy hydrocarbons, for example, 2 to 5 pounds per square inch absolute. These heavy hydrocarbons pass overhead through conduit 23 and are condensed by condenser 24 and then supplied as a liquid to run down tank 25. The tar is removed as bottoms from the vacuum tower through conduit 26. The vacuum tower 19, conduit 23, and run-down tank 25 are all maintained under the desired reduced pressure by means of an ejector 27 or other suitable means connected to the upper end of tank 25 by conduit 28. The use of an atmospheric separator and vacuum separator in combination of a type suitable for use herein is described in detail and claimed in United States patent application Serial Number 201,023, filed December 15, 1950.

The condensed hydrocarbons in tank 25 constitute the liquid hydrocarbon charge for the reactor 15. This liquid charge is pumped from the bottom of tank 25 through conduit 29 by pump 30. The liquid charge passes first, in normal operation, through a flow measuring device 31, such as an orifice. A flow rate controller 32 is connected to device 31 and operates a flow control valve 33 in line 29 to maintain the desired rate of liquid charge flow to reactor 15. A by-pass line 34 is provided around control valve 33 with valve 35 thereon. This by-pass is normally not used, however. Extending from conduit 29, downstream of control valve 23, is a reactor by-pass conduit 36 with valve 37 thereon. This by-pass also is not used in normal operation and valve 37 is kept closed. The liquid charge next passes through a strainer 38 where any foreign matter, such as mill scale from the piping suspended in the liquid, is removed. Downstream of strainer 38 is blow-down line 39 with valve 40, normally kept closed. The liquid charge then passes through the remainder of conduit 29 into reactor 15 and is supplied to a liquid charging device therein, which is described hereinbelow.

Only a portion of the liquid charge passed through conduit 29 is injected into the contact material flowing in reactor 15. The remainder is removed from the opposite side of the reactor through a conduit 41 and returned to run-down tank 25, through conduit 42, connecting with conduit 41. A flow measuring device 43 is provided in conduit 42 which actuates a flow rate controller 44 to control the rate of recirculation of liquid charge by means of control valve 45. A suitable technique for recirculating cooled liquid to the liquid manifold to maintain it below coking temperatures is the subject of claims in United States Patent Number 2,771,406.

The granular catalytic contact material gravitates from a supply hopper (not shown) into seal chamber 46 through conduit 47. Inert seal gas, such as steam or flue gas, is supplied to chamber 46 through conduit 48 at a rate sufficient to maintain a slightly greater pressure in chamber 46 than in the upper section of reactor 15. The rate of seal gas supply is controlled by operating control valve 49 in response to differential pressure controller 50. Contact material passes into the upper end of reactor 15 through conduit 51, then downwardly through the conversion zone of reactor 15 as a substantially compact bed. Hydrocarbon charge supplied as liquid and vapor passes downwardly through the bed to effect the desired conversion reaction. The products of conversion are removed through conduit 52. Suitable gas disengaging means may be used in conjunction with conduit 52 to efficiently disengage the gaseous products from the reaction bed of contact material. An inert purge gas may be admitted to reactor 15 through conduit 53 to purge the outgoing spent contact material free of adhering hydrocarbons.

Spent contact material is removed from the lower section of reactor 15 through conduit 54 at a rate controlled by valve 55 to promote downward movement of contact material particles through the reaction bed of contact material at a uniform linear velocity across the horizontal cross-section of the bed. To this end, suitable baffling may be provided in the lower section of reactor 15. The spent contact material is then reconditioned for re-use in the conversion zone. Where the contact material has a catalytic effect on the reaction, this reconditioning will normally take the form of a controlled burning of the carbonaceous contaminants or coke deposited on the catalyst during the conversion in a manner well known in the art. Where the contact material is inert in character the reconditioning may consist only of reheating the contact material for re-use in the conversion zone. The reconditioned contact material is then returned to seal chamber 46, from which it passes into reactor 15.

The charge stock preparation system may take many other forms than that shown. For example, the reduced crude charge may be de-asphalted by means other than distillation, such as by the use of a selective solvent. The de-asphalted charge would then be passed to separator 13 after heating and the bottoms from the separator supplied directly to reactor 15 as liquid charge. Where the process is a thermal conversion, it is frequently sufficient to merely heat the reduced crude and supply it directly to reactor 15 without first removing the tar.

Figure 2:
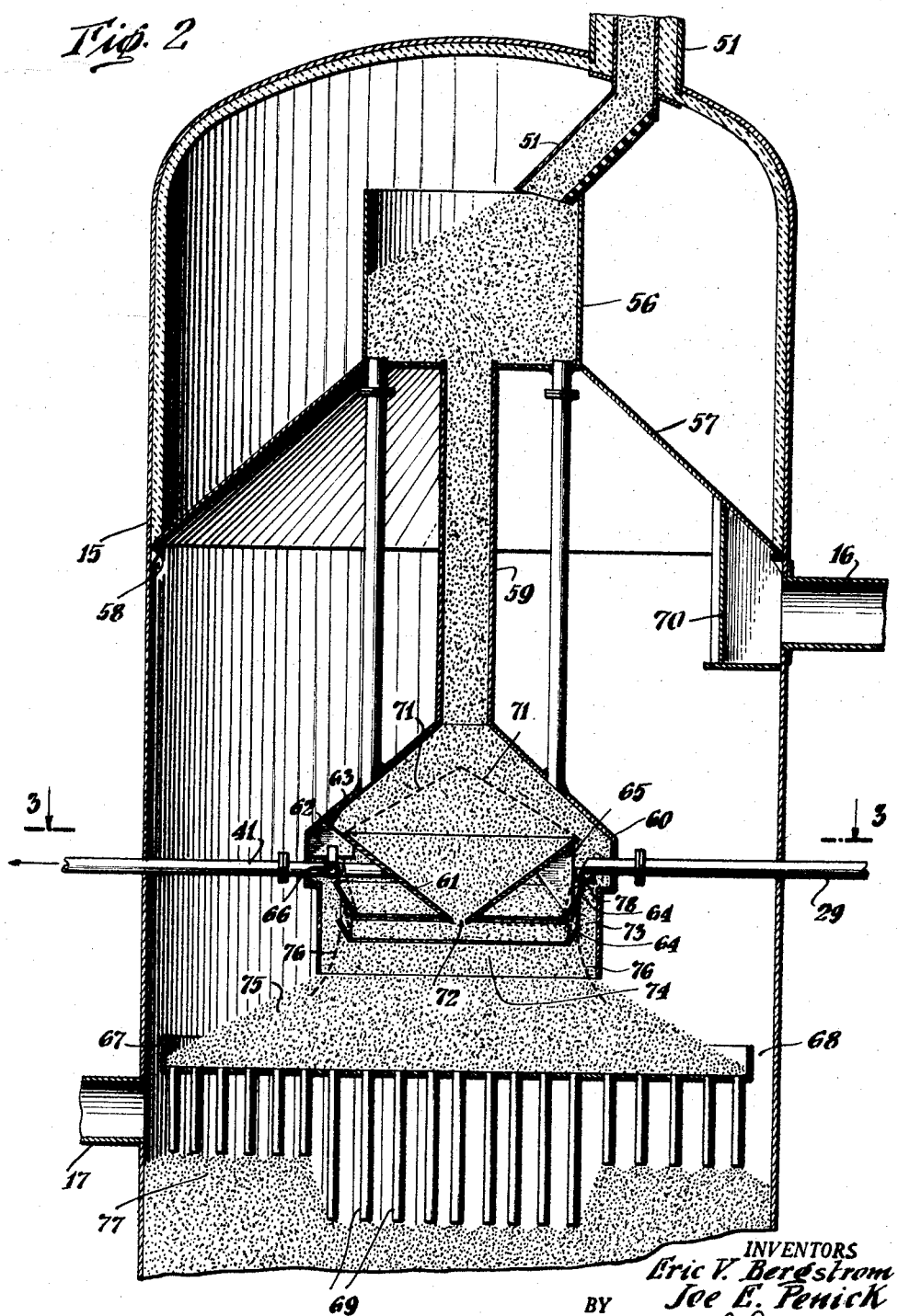
Figure 2 is an elevational view, partially in section, of the upper section of a reaction vessel employing the method and apparatus of this invention.
Figure 3:
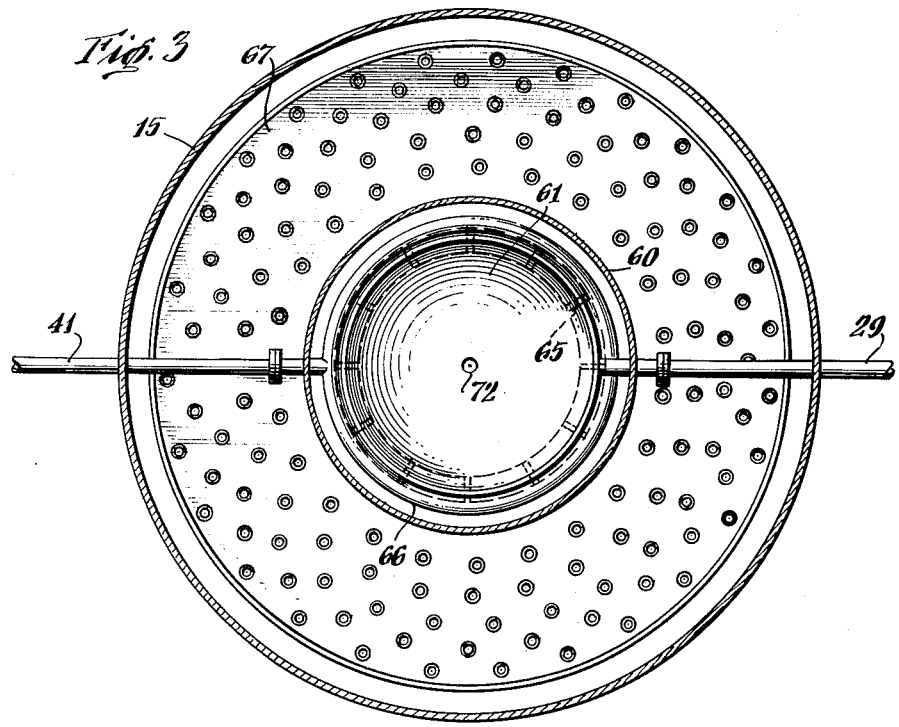
Figure 3 is a sectional view along line 3—3 of Figure 2.

The details of the construction in the upper section of reactor 15 are shown in Figures 2 and 3, which are best considered together. Contact material conduit 51 extends into the upper end of vessel 15 and terminates so as to discharge contact material into a centrally disposed receptacle 56. Receptacle 56 is supported by a frusto-conical partition 57 which extends inwardly and upwardly from a support member 58 on the walls of the vessel 15. Extending centrally and vertically downwardly from the bottom of receptacle 56 is conduit or passageway 59, which terminates within the upper section of vessel 15 at a level below the bottom of receptacle 56. A hood 60 is attached to the lower end of conduit 59. Hood 60 has a hollow, frustoconical upper section which attaches at its small diameter to the lower end of passageway 59 and a hollow cylindrical lower section. The horizontal cross-sectional area of the lower section of hood 60 is substantially less than the horizontal cross-sectional area of vessel 15. Hood 60 forms the upper section of a conversion chamber or zone with the main body of the chamber or zone being formed by the remainder of vessel 15 below hood 60. A bage 61, in the shape of an inverted hollow cone, is fixed symmetrically within the upper section of hood 60 by support members 62 extending from hood 60. The upper end of baffle 61 has a cross-sectional area amounting to a major fraction of the horizontal cross-sectional area of hood 60, so that a narrow annular passageway for contact material flow is formed between hood and baffle.

Spaced vertically beneath baffle 61 are vertically spaced-apart ring or hoop baffles 64 in the form of hollow inverted frusto-conical sections. The upper ends of said baffles enclose horizontal cross-sectional areas amounting to a major fraction of the horizontal cross-sectional area of hood 60. Baffles 64 are placed so as to maintain a narrow peripheral region of contact material flow between the baffles and the walls of hood 60 and a central region of substantially lower velocity contact material flow within the baffles 64, as is explained hereinbelow. Baffles 64 are supported from baffle 62 by spaced-apart support members 65.

A liquid spray ring 66, having a diameter greater than the diameters of the upper ends of baffles 64, is positioned within hood 60 on a horizontal plane at a level between the uppermost of baffles 64 and baffle 61. Details of this spray ring are described hereinbelow in connection with Figure 4. A plurality of orifices penetrate the underside of ring 66 through which liquid charge may be injected or sprayed into the contact material which will flow in the narrow peripheral region between baffles 64 and the walls of hood 60. Liquid charge supply conduit 29 connects into one side of ring 66 and liquid charge recycle conduit 41 extends from the opposite side of the ring. A cylindrical receptacle or pan 67 is positioned centrally beneath hood 60 on a horizontal plane within the upper section of vessel 15 at a level suitable to receive contact material from hood 60 before it reaches the walls of vessel 15. Receptacle 67 has a horizontal cross-sectional area less than but approaching that of vessel 15, so that space 68 is defined between the sides of receptacle 67 and the walls of 15. A plurality of vertical contact material conduits 69 extend downwardly from the bottom of receptacle 67 to a common level within the upper section of vessel 15. Conduits for the supply of vaporized hydrocarbon charge are provided at two levels in vessel 15, conduit 16 above receptacle 67, and conduit 17 at a level below the bottom of receptacle 67 but above the lower ends of conduits 69. A distributor baffle 70 is provided in front of conduit 16.

In operation, fresh granular contact material, at a temperature suitable for the desired conversion, gravitates into vessel 15 through conduit 51 into receptacle 56. Contact material passes downwardly from the lower section of the accumulation of contact material in receptacle 56 as a single central substantially compact stream through passage 59. This stream is expanded outwardly under the inclined surfaces of the upper end of hood 60 as a frusto-conical shaped stream. The stream during expansion, takes this form because a substantially stagnant layer of contact material is maintained on the upper side of baffle 61. The upper limits of this layer are indicated by lines 71. A small hole 72 is provided in the bottom of baffle 61, so that the contact material forming the stagnant layer on 61 will slowly be changed. This hole 72 should not be so large as to allow any substantial flow of contact material in relation to that flowing around the stagnant layer. Hole 72 is not necessary to the invention and may be eliminated if desired.

Substantially, all of the contact material supplied to the conversion zone within vessel 15 through this frusto-conical stream and annular passage 63, and is supplied to an area adjacent the periphery of a single, central, substantially compact, downwardly gravitating feed column or stream of contact material maintained below baffle 61 within the lower section of hood 60. Because the hood 60 is of cross-section only a minor fraction of the cross-section of the reactor, yet carries the entire flow of contact material to the reaction bed, a peripheral region 73 of high velocity contact material flow and a central region 74 of substantially lower velocity contact material flow are formed near the lower end of the hood. Baffles 64 act to extend these regions upwardly in the feed column in hood 60 and cause the formations of the regions at higher levels in the feed column. The formation and maintenance of these high and low velocity regions are made possible by the flow characteristics of granular solids.

The contact material column or stream leaving hood 60 is expanded outwardly in free surface flow to a horizontal cross-sectional area approaching that of vessel 15. Contact material from the central region 74 passes substantially unidirectionally downwardly to form the central region of the accumulation of contact material 75 in receptacle 67. The contact material to supply the remainder of the accumulation 75 is formed by contact material drawn from a narrow peripheral region of the stream in hood 60. Thus, contact material flowing in the peripheral region between the lines of internal flow 76 and the walls of hood 60 supplies all the area of accumulation 75 not lying substantially directly beneath hood 60. Contact material from accumulation 75 passes downwardly through passages 69 to supply contact material to the upper surface of a downwardly gravitating, substantially compact reaction bed of contact material 77. Contact material particles pass through bed 77 at a substantially uniform velocity across the horizontal cross-section of the bed and therefore contact material is drawn at about an equal rate from each of uniformly spaced conduits 67 and from accumulation 75 thereabove. Therefore, the flow of contact material through each unit of horizontal cross-sectional area of accumulation 75 will be the same.

Hood 60, and therefore the feed stream or column therein, have a horizontal cross-sectional area amounting to only a small or minor fraction of the horizontal cross-sectional area of the accumulation 75 and of vessel 15 and reaction bed 77. Therefore, the central area of accumulation 75, which is supplied by the large central region of the feed column in hood 60, will carry only a small or minor fraction of the total contact material flow to bed 77; on the other hand, the narrow peripheral region 73 of the feed column supplies the major portion of accumulation 75 and bed 77, and therefore the velocity in region 73 will be substantially higher than in region 74 and more of the contact material will pass through region 73 than region 74. It will be noted that line 76, which defines the area of the feed column in hood 60 supplying the outer area of accumulation of contact material 75, slopes inwardly away from the walls of hood 60, so that the horizontal area of region 73 increases the further it is removed from the bottom of the feed column. As the area increases the velocity decreases. Therefore, where the dimensions of the hood require it, baffles 64 are so placed that at succeedingly higher levels they again narrow the peripheral region 73 so as to maintain it generally below 8 inches in width and preferably within the range 3.5 to 6 inches in width, thus maintaining the high velocity in region 73 at higher levels in the feed column. A new flow pattern line 78 is formed with each baffling, closer to the walls of hood 60 than the one below.

Liquid hydrocarbon charge is supplied to spray device or ring 66 by means of passage 29. Spray ring 66 is at a level substantially above the lower end of hood 60 and the feed column therein. A portion of the liquid charge supplied through 29 is injected into high velocity region 73 of the feed column by means of the orifices in the inner side of ring 66. The remainder of the liquid charge is removed from the opposite end of ring 66 through passage 41 to the run-down tank where it is cooled by mixture with the accumulation of cooler liquid charge therein before return to ring 66. By this means the liquid in ring 66 may be maintained cooler than the contact material flowing around the ring and coking in the orifices in the ring 66 minimized. Liquid injected into region 73 immediately mixes with the large volume of hot contact material flowing therein. This contact material will exist at a temperature well above the desired conversion temperature and even further above the temperature of the liquid. Thus, the liquid charge will be vaporized and partially converted to vapors as it passes downwardly with the contact material through region 73. The vapors so formed can immediately expand between baffles 61 and 64 into the lower velocity region 74, which is of relatively larger cross-section, so that the flow of contact material through the feed column will not be disrupted. The vapors so formed expand into the accumulation of contact material 75, from which they pass into the upper end of bed 77 mainly by passing out of the open upper surface of accumulation 75 and then through space 68 into bed 77. Some vapors may also pass downwardly through conduits 69. Vaporized hydrocarbon charge may be supplied at either or both of two levels through conduits 16 and 17.

Receptacle 67, with the accumulation 75 of contact material therein, finds particular application where a separate vaporized hydrocarbon charge is so introduced. The vaporized hydrocarbon charge must normally be supplied to the reactor at temperatures below the desired conversion temperature and below the contact material supply temperature to avoid thermal conversion of the vaporized charge in the preheater or tar separator. If receptacle 67 were eliminated and the feed column of contact material delivered directly onto the open surface of a reaction bed of contact material which extended completely across the reactor with the vaporized charge being passed directly into the open upper surface of the bed, the hot contact material from the high velocity region 73 of the feed column, as it expanded across the bed surface, would flow across cooler vaporized charge entering the upper end of the bed. Thus, contact material particles would be cooled by the vaporized charge and the further a particle moved transversely the more it would be cooled. It is apparent then that the particles which passed to the outer edges of the bed would be cooled most and those in the center of the bed least, so that a temperature gradient would be set up across the reaction bed which would lead to uneven conversion of the hydrocarbon charge. By the use of pan 67, with uniformly spaced pipes 69, temperature gradients which arise because of this cross-flow may be minimized. If pipes 69 are spaced apart a center-to-center distance less than 20 inches, and preferably less than 10 inches, there will be sufficiently little transverse flow of particles across bed 77 to effect a substantial reduction in temperature gradients, since any given particle will travel only a short distance across bed 77 before it encounters particles from the next adjacent stream. Thus, where vaporized charge is supplied through 17, it will pass directly into reaction bed 77 in the space between passages 69, and there will be only a relatively minor temperature differential across bed 77 due to cross-flow of vaporized charge and contact material. Where vapor is supplied through 16, a temperature gradient, due to this particular cause, is also minimized by using receptacle 67 and pipes 69. True, there is a large transverse layer of contact material flowing across accumulation 75. However, the vapors formed from the liquid charge which disengage from accumulation 75 and issue from its surface and the lower pressure drop through annular space 68 act to cause the vaporized charge to flow through space 68 and into bed 77 between pipes 69 rather than contacting the transverse layer of contact material flowing across accumulation 75. This concept of minimizing poor temperature distribution due to cross-flow of hot contact material and cooler vapors by delivering contact material to the reaction bed as a plurality of streams spaced less than 20 inches center-to-center is the subject matter of claims in United States Patent Application Serial Number 529,063, filed August 17, 1955, now U.S. Patent No. 2,846,370. However, the particular combination here disclosed of the receptacle and pipes with the liquid feed hood and injection system is considered to be part of this invention.

There is one further cause of temperature gradients across the reaction bed which the mere plurality of pipes 69 does not eliminate. The contact material from central region 74 of the feed column in hood 60 will be discharged into accumulation 75 at a temperature higher than the contact material from the peripheral region 73. This occurs because the contact material in the peripheral region is cooled by vaporizing and converting liquid charge. To minimize this temperature gradient the portion of conduits 69, which are directly below hood 60, extend to a lower level than those which are not below the hood. This makes bed 77 shallower in the center. The hotter contact material from region 74 flows through these central conduits and supplies the central portion of bed 77. Since this central portion is shallower, there will be a greater flow of vapors into the central portion per unit area than through the outer annular portion. This greater flow will tend to cool the contact material in the central region of bed 77 to a greater extent than that in the outer region, but since the contact material there is hotter, by a proper choice of level for the central pipes of 69, the temperature gradient, due to the region 74 of the column in hood 60 being hotter than region 73, may be eliminated shortly below the bed surface. The method for eliminating temperature gradients due to this cause by providing different bed heights for the hotter and cooler contact material is the subject of claims in United States patent application Serial Number 333,488, filed January 27, 1953, now U.S. Patent No. 2,808,367.

The term "bed" is used broadly in this invention to include a contact material mass comprising an accumulation like 75 as its upper section and a reaction bed 77 as its lower section, as well as a mass which is continuous over its entire length without any gaps like those between conduits 69. Thus, in Figure 1, the contact material bed may be said to include both accumulation 75 and reaction bed 77.

Figure 4:
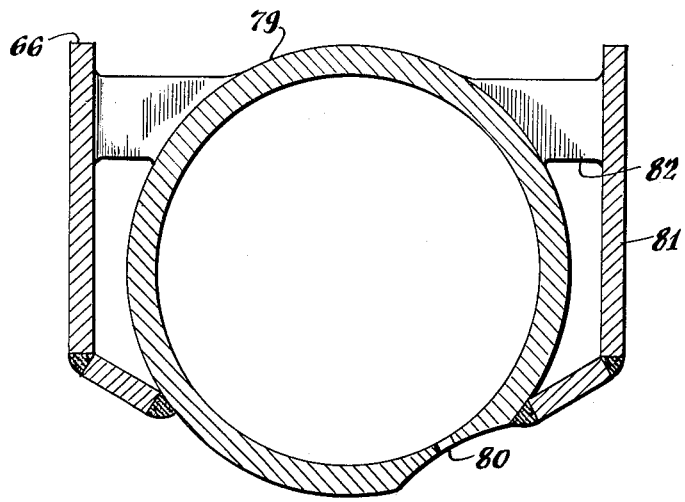
Figure 4 is a sectional view of the liquid injection means of this invention.

The construction of one suitable type of liquid hydrocarbon injection means is shown in Figure 4, which is a sectional view of the spray ring 66 of Figures 2 and 3. This spray ring is made up of a central circular pipe ring 79 having a plurality of spaced-apart orifices 80 through its underside. Orifices 80 are offset from the vertical by an angle such that when the ring is imbedded in flowing contact material, some of the contact material will flow directly over the area adjacent orifices 80 to scrub off any coke which may accumulate there. The wall thickness of pipe 79 around orifices 80 is reduced so that the depth of orifices 80 is reduced. Thus, should any coke form in orifices 80, the coke "plug" therein will be of relatively little thickness and may be easily eliminated by periodic burning out or reaming out. A ring-shaped receptacle 81 is around pipe 79. Receptacle 81 is of greater dimensions laterally than ring 79, so that a space 82 is defined between pipe 79 and the walls of receptacle 81. Receptacle 81 has a bottom which fits tightly to pipe 79 at a level above that of orifices 80, and receptacle 81 extends upwardly to a level adjacent the top of ring 79.

When the spray ring is imbedded in flowing contact material, a stagnant layer of contact material will accumulate in space 82, within receptacle 81, around pipe 79, to insulate the liquid flowing in the pipe from the hot contact material flowing around it. This insulating effect, together with the recycling of a substantial part of the liquid flowing in ring 79 to the run-down tank to be cooled, acts to minimize the formation of coke within ring 79 and plugging of orifices 80. However, such coke formation and plugging may still occur over long periods of time, so that provision is made in this invention to burn coke from the spray ring while the reactor continues to operate on vapor charge.

The system provided for coke burning is best illustrated by considering Figures 1 and 4 together. When substantial coking in orifices 80 and elsewhere in pipe 79 has occurred, the flow of liquid charge to the reactor is stopped by closing valve 83 in liquid feed line 29 and opening valve 37 in by-pass line 36. Valves 84 and 85 in recirculation line 42 are also closed. First, an inert purge gas, such as steam, is supplied to ring 79, passing inwardly through conduit 86, from which it flows into conduit 87 and then into conduit 29 and through that conduit into spray ring 79. The steam and hydrocarbons, after passage through the ring, are removed through conduit 41 and pass into conduit 42, from which they pass out through blow-down line 88.

After the ring is free of hydrocarbons, an air-steam mixture, preferably heated to 850° F. to 900° F., is supplied to ring 79 in controlled proportions to burn out the coke therein, air entering through conduit 87 and mixing with steam from conduit 86 and the mixture passing into conduit 29 and then into ring 79. The air acts to burn the coke in ring 79 and orifices 80, while the steam absorbs the heat produced by the burning. Preferably, the air-steam mixture is supplied for half the required time to conduit 29 and the other half to conduit 41 by passing the mixture around through pipe 89. This promotes equal burning on both sides of the ring. During this entire operation vaporized charge may continue to be processed within reactor 15, since the air-steam mixture may flow into the reactor and combine with the hydrocarbon vapor therein without hazard. After the burning is completed, the spray ring is again purged with steam and then the flow of liquid charge to the ring is restored.

Figure 5:
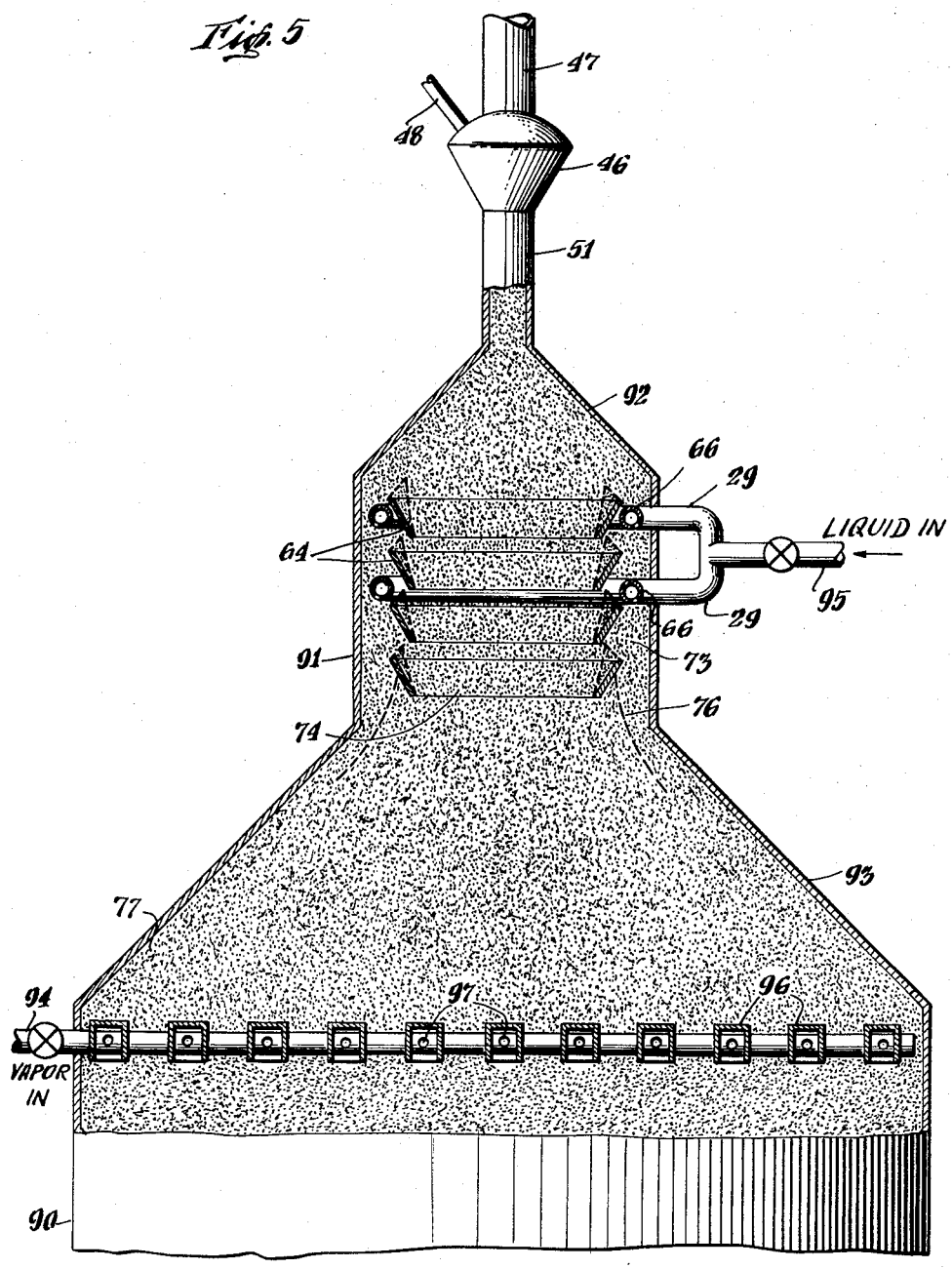
Figure 5 is an elevational view, partially in section, of the upper section of a reaction vessel employing an alternative form of this invention.

Figure 5 illustrates a modified form of this invention. Shown therein is a conversion chamber having a cylindrical main body 90 of substantially horizontal cross-sectional area and an upper section 91 of substantially less horizontal cross-sectional area than the main body 90. A tapered roof 92 is provided on the upper end of section 91 and a tapered connecting and confining member 93 connects the lower end of section 91 with the upper end of the main body 90 of the conversion chamber. Supply conduit 51 connects to the upper end of roof 92. The sides of members 92 and 93 make angles with the horizontal greater than the normal angle of surface slope of the contact material. This angle of surface slope varies with the particular contact material but is normally about 30 degrees. Preferably, the sides of members 92 and 93 make angles with the horizontal within the range about 40 to 65 degrees. By maintaining members 92 and 93 at angles greater than the angle of surface slope of the contact material, segregation of the contact material, according to particle size, as it expands, is avoided.

The operation of the apparatus of Figure 5 is similar to that of Figure 2. Reaction bed 77 has a single compact feed column or stream of contact material extending centrally up from an area on its upper surface amounting to only a minor fraction of the horizontal cross-sectional area of bed 77. This column is contained within section 91 and is of substantially less horizontal cross-sectional area than bed 77. A peripheral high velocity stream or region of contact material flow 73 and a central lower velocity stream or region 74 are maintained within the feed column by the proper placement of baffles 64. Liquid charge is injected into the high velocity stream at a plurality of levels by the use of a plurality of vertically spaced-apart spray devices 66. Liquid is supplied to spray devices 66 by conduits 29, which in turn are supplied by conduit 95. Vapors formed from the liquid charge expand into low velocity stream 74. Contact material from the low velocity stream supplies a small central area of bed 77 while contact material from stream 73 expanding outwardly under the solid surfaces of member 93 supplies the remainder. Vaporized charge may be supplied to bed 77 through conduit 94. Vapors from 94 pass into a plurality of horizontally spaced-apart distributors 96 through orifices 97. The vapors then pass into bed 77. Conduit 94 should be situated at a level below the lower end of member 93 and therefore below the level of contact material expansion from the feed column. In this form of the invention there is no central baffle within the feed column like 61 of Figure 2. The use of this baffle is not essential to the invention but is desirable. Also, in this form of the invention there is no free surface flow of contact material while expanding from the feed column to supply bed 77 due to the angle of the downwardly and outwardly sloping surfaces of member 93. Thus, segregation of contact material, according to particle size, is minimized.

Figure 6:
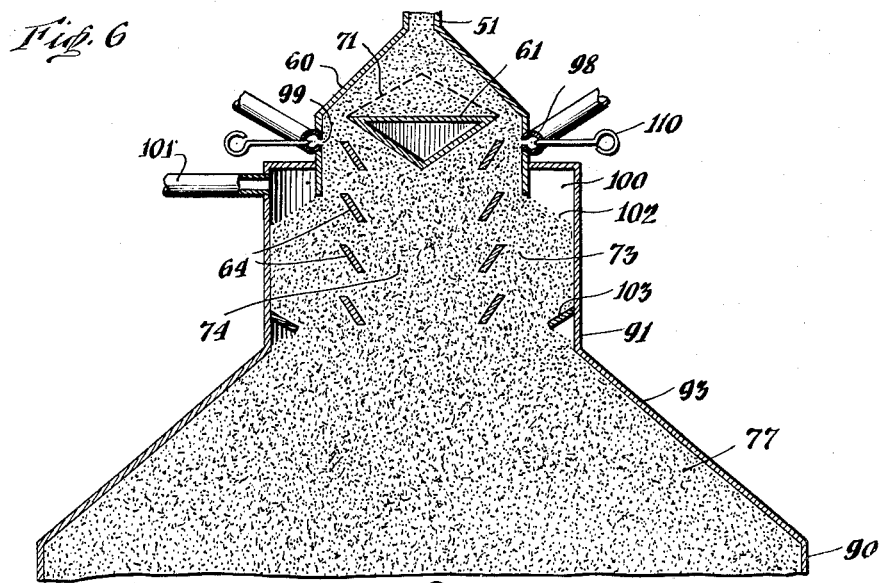
Figure 6 is an elevational view, partially in section, of the upper section of a conversion vessel employing another alternative form of this invention.

Figure 6 illustrates another form which this invention may take. Shown therein is a conversion chamber having main body 90 and an upper section 91 of substantially less horizontal cross-sectional area than the main body. Hollow frusto-conical member 93, with sides at an angle greater than the angle of surface slope of the contact material, connects sections 90 and 91. Extending into the upper end of upper section 91 is hood 60 of less horizontal cross-sectional area than upper section 91 and terminating at a level substantially above the lower end of 91. Within hood 60 is inverted conical baffle 61. Ring or hoop baffles 64 are vertically spaced apart below baffle 61 from within hood 60 to the lower section of the upper conversion chamber section 91. A ring manifold or pipe 98 extends around the outside of hood 60 and is tightly imbedded in the wall of hood 60, so that the inner side of pipe 98 extends through the wall. A plurality of spaced-apart orifices 99 penetrate this inner wall and a reamer 110 is fastened to pipe 98 in front of each of orifices 99 so as to be capable of being moved forward into the orifice.

The operation of the liquid charge system of Figure 6 is similar to that of Figure 2. Baffles 61 and 64 provide high and low velocity regions 73 and 74. Liquid charge is injected only into the high velocity region 73. The liquid injection here is accomplished by injecting the liquid as a plurality of streams which are directed laterally inwardly from the outer edge of the high velocity region through orifices 99 from pipe ring 98, which is positioned outside hood 60. Vapors formed from the liquid charge expand from region 73 into central region 74. High velocity region 73 is expanded outwardly from the lower end of hood 60 to the wall of upper section 91 in free surface flow. Vaporized hydrocarbon charge, at a temperature substantially below the contact material supply temperature, is passed into the plenum space 100 above the expanded section of 73 and between hood 60 and the upper section 91 of the conversion chamber through passage 101. The vaporized charge enters the expanded portion of region 73 and passes downwardly with the contact material in the lower section of region 73 to effect a temperature equalization between vaporized charge and contact material before reaching the expanded portion of bed 77 and thereby avoiding temperature gradients across the reaction bed due to cross-flow of cooler vapors and hot contact material. There is cross-flow at the upper end 102 of this expanded section but it is of minor nature because of the small width of surface 102. Any temperature gradient which has occurred because of this cross-flow is removed, however, by the use of a mixing baffle 103 in the lower section of high velocity region 73.

Any coke which may be formed in orifices 99 is removed in the system of Figure 6 by reaming out the openings with reamer 110. This is an alternative to burning out the coke as previously described. It will be noted that in Figure 6 the ring manifold for the supply of liquid charge is outside the hood 60 rather than imbedded in the contact material column in the hood as in Figure 2. Of course, an outside liquid manifold, like that of Figure 6, could be used with the apparatus of Figure 2 also. Placing the manifold outside the hood has the advantage of avoiding direct contact between the manifold with the liquid plenum space therein and hot contact material. Thus, the manifold should run cooler and therefore have less tendency toward coke formation in orifices 99.

In its broadest form, this invention does not require any baffles, either the central or the ring or hoop-shaped peripheral baffles, in the feed column of contact material in hood 60, provided that the hood 60 is so dimensioned and arranged with respect to the reaction bed that there is provided at the level of liquid injection a high velocity region of contact material flow not wider than 8 inches and an adjacent low velocity region of flow. The high velocity region should occupy less than 50 percent of the total horizontal cross-section of the feed column confined by hood 60, and 60 percent or more of the total contact material flow should occur through the high velocity region. Such arrangements usually require the hooded section to have a cross-sectional area only a small fraction of the reaction bed cross-sectional area. It should further be noted that the lines 76 corresponding to the lines of internal flow for material flowing to the larger and annular area of the reaction bed converge inwardly, so that with an unbaffled contact material feed stream, the liquid must be injected near the lower end of the hood in order that the thickness and relative area of the region of injection falls within the above stated broad specification. If it becomes desirable to inject the liquid at higher levels in the hooded section, then the peripheral hoop baffles, like baffles 64 of Figure 2, must be used.

Figure 7:
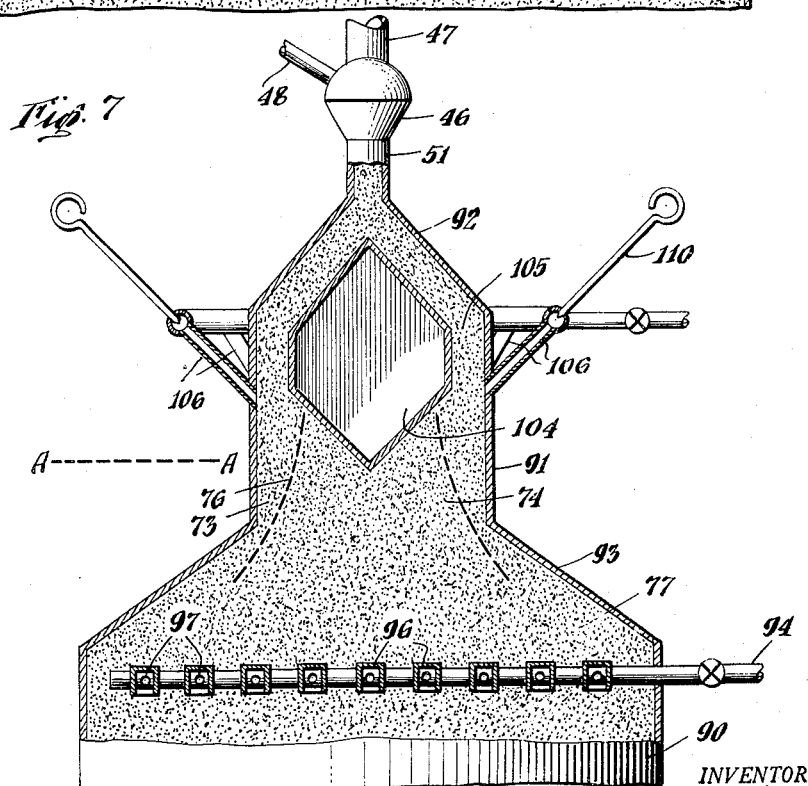
Figure 7 is an elevational view, partially in section, of the upper section of a conversion vessel employing a further modified form of this invention.

Figure 7 is an example of an arrangement not requiring the use of such peripheral baffles but employing a central baffle. Figure 7 has about the same external construction as the apparatus of Figure 5. However, no hoop baffles 64 are used but a central baffle 104 is supplied in the upper section 91 of the conversion chamber. Baffle 104 has a conical upper section, a cylindrical central section and an inverted conical lower section. Baffle 104 is placed symmetrically within section 91 and the cylindrical center portion of the baffle is of less horizontal cross-section than the upper section 91 of the conversion chamber, so that an annular passage 105 is provided between the two.

In operation, fresh hot contact material enters the conversion chamber through passage 51 and passes outwardly over baffle 104 and then downwardly through passage 105. From passage 105 the contact material expands inwardly beneath baffle 104. Annular passage 105 forms the upper section of a peripheral high velocity region of flow 73 within the feed column contained within section 91. The lower section of this high velocity region is formed below the cylindrical portion of baffle 104 by proper dimensioning of section 91. Adjacent to this lower section of region 73 is central low velocity region 74. The total flow of contact material to bed 77 passes through the upper section of region 73 in passage 105. This stream splits and a major portion continues in the lower section of region 73 while the remainder forms region 74.

Liquid hydrocarbon charge is injected laterally into the contact material flowing in the upper section of region 73 by means of a plurality of passages 106 extending through the wall of the upper section 91 of the conversion chamber from ring header 107 outside of the conversion chamber. The liquid is injected at a level above but less than 6 inches above the upper end of low velocity region 74, and preferably less than 3 inches above the upper end of region 74. Vapors formed pass out of the lower end of passageway 105 and expand into region 74.

This modification of the invention differs in several respects from the previous forms of the invention shown. First, the liquid charge here is injected into a region through which the total contact material supply to the conversion zone passes rather than just a major portion of the contact material flow. Second, the low velocity region 74 is not provided directly opposite the points of liquid injection on the same horizontal level but is provided immediately therebelow, and in no case more than 6 inches and preferably more than 3 inches therebelow. If desired, liquid may be injected at a lower level, such as A—A of Figure 7, or at several vertically spaced levels. Conduits 106 may be periodically freed of any coke deposits by reaming them out with reamers 110, which are suitably mounted in front of the upper end of each of passages 106.

Figure 8 illustrates an apparatus very similar to that of Figure 2, except that a different method of controlling the hot central core in reaction bed 77 is employed. It will be noted that pipes 69 in Figure 8 are all of the same length. The central core is controlled by inverted hollow frusto-conical baffle 120 which has its upper end large enough to catch substantially all of the catalyst flowing from hot central core 74 within hood 60. The lower end of baffle 120 has an opening amounting to only a very small percentage of the area of reaction bed 77. The baffle therefore reduces the flow in central region 74 and reduces the hot area within reaction bed 77 to such a small area that it has relatively minor influence on the product produced in the reaction.

It is apparent from the above discussion that this invention provides a system for the introduction of liquid hydrocarbon charge wherein the liquid charge contacts, on introduction, a major portion of the contact material flowing to the reaction bed in the system. Further, at the point of liquid injection the contact material is moving downwardly at a very substantially higher velocity than is prevalent in the reaction bed therebelow. Since the liquid charge is injected into a substantially compact high velocity stream, the possibility of the liquid contacting metal surfaces in the reactor is reduced. However, even if some liquid does contact hot metal, a coke build-up does not occur, since all metal surfaces which the liquid could possibly contact are scrubbed by high velocity flowing contact material so that the coke is removed as fast as it forms.

This invention requires a compact feed column with laterally adjacent high velocity and low velocity regions of flow. These two regions may be formed by proper baffling of the flow in the feed column or by proper dimensioning of the feed column with respect to the reaction bed. Liquid hydrocarbon charge is supplied only to the high velocity region either at a level directly opposite the low velocity region or at a level above the upper end of the low velocity region, provided that in the latter case the level of injection is less than 6 inches and preferably less than 3 inches above the upper end of the low velocity region.

The high velocity region at the level of liquid injection should be of a width less than 8 inches and preferably of a width within the range 3.5 to 6 inches. At least 60 percent, and preferably at least 90 percent, of the contact material flow to the reaction bed should pass through the high velocity region and the area of the high velocity region should comprise less than 50 percent of the total horizontal cross-sectional area of the feed column. The level of liquid injection should preferably be high enough above the lower end of the feed column to provide for at least substantially complete vaporization of all the liquid charge, which will vaporize without cracking, before the contact material carrying it leaves the feed column to be expanded across the reaction bed. Still more preferably, the level of liquid injection should be high enough that no more than about 10 percent of the liquid remains on the contact material as it leaves the feed column.

However, it is not desirable to have the level of liquid injection too high because this unnecessarily adds to the height of the reactor and to the pressure drop through the reactor. Generally, it has been found desirable to have the level of liquid injection a height above the feed column within the range 12 to 18 inches so that there is suitable contact between liquid and contact material before leaving the hood.

The ratio of the horizontal cross-sectional area of the reaction bed 77 to the horizontal cross-sectional area of the feed column should be high enough to provide for the required regions of high and low velocity flow. Moreover, it is critically necessary that the feed column be of a size sufficient that the vapor formed when the liquid contacts the hot contact material will not cause there to exist within the feed column an unduly high pressure. To avoid such a pressure the circumference of the feed column should be such that the hydrocarbon is supplied to the feed column at the rate of 350 to 875 gallons per hour per foot of circumference. Also, for the same reason, it is critical that the horizontal cross-sectional area of the feed column be such that hydrocarbon is supplied to the column at the rate of 175 to 350 gallons per hour per square foot of cross-sectional area. For the first limitation the circumference of the feed column at its lower end is used in determining if the rate is within the critical range. For the second limitation the rate should fall within the specified range when any cross-sectional area below the level of liquid injection is used.

The space velocity in the feed column should be within the range about 1 to 20, and preferably about 4 to 12 volumes of hydrocarbon charge (as 60° F. liquid) per volume of feed column per hour. The pressure drop through the feed column per foot should be about the same as the pressure drop through the reaction bed per foot.

The contact material should be supplied to the conversion zone at a temperature suitable to supply the heat of reaction plus the heat required to elevate the temperature of the hydrocarbon charge to the desired conversion temperature without the contact material falling below the desired conversion temperature. Generally, for catalytic operations, temperatures within the range 800 to 1200° F. are required. For thermal cracking operations the contact material inlet temperature may range as high as 1700° F. Liquid and vaporized hydrocarbon charges should generally be heated before being supplied to the conversion zone to an elevated temperature not over 700° F. The space velocity of the total hydrocarbon charge through the reaction bed should generally be within the range about 1 to 10 volumes of hydrocarbon charge (as 60° F. liquid) per volume of reaction bed per hour. The ratio of contact material to hydrocarbon charge should generally be within the range about 0.5 to 20 parts of contact material per part of charge by weight.

The various parts of the method and apparatus of this invention may take many different forms than those shown in the attached drawings. For example, while the reactor and like parts therein have been shown as circular in cross-sectional shape, they may take any other desired shape, such as rectangular, hexagonal, etc. As previously stated, baffling within the feed column is not essential to the invention if the feed column is of proper dimensions. However, it is preferable to use at least a central baffle like 61. While the various drawings herein all show a vaporized hydrocarbon charge supplied to the conversion zone besides the liquid hydrocarbon charge, this invention is equally applicable to systems employing only a liquid charge. Also, the charge injected from spray device 66 need not be all liquid but may be a mixed phase charge.

As an example of a suitable construction, according to this invention, a catalytic cracking reactor designed to crack 15,000 barrels per day of hydrocarbon charge will be considered. The design was similar to that shown in Figures 2 and 3. The reactor was 16 feet in diameter and hood 60 was placed centrally therein and was 7 feet in diameter. The conical upper section of hood 60 had sides at an angle of 40 degrees with the horizontal, and the lower cylindrical section of the hood was 3 feet, 5¼ inches high. Baffle 61 had a 6 feet, 1¾ inches diameter at its upper end and the upper end of baffle 61 was on the same horizontal plane as the beginning of the cylindrical portion of hood 60. Baffle 61 was 2 feet, 1 inch high and had a 4 inch hole at its lower end. There were 2 inverted frusto-conical baffles 61 made of ½ inch plate. The sides of these baffles made angles of 60 degrees with the horizontal. The upper baffle had a 5 feet, 3⅝ inches diameter at its lower end and had 11 inches slant height with its upper end 10¼ inches from the upper end of baffle 61. The lower of baffles 64 had a diameter of 5 feet, 6½ inches at its lower end and had 6¼ inches slant height and positioned with lower end 10½ inches above the bottom of hood 60. Spray ring 66 was a 3 inch pipe ring positioned at a level 4¼ inches above the upper end of the higher of baffles 64. Spray ring 66 had a 6 feet, 6½ inches diameter from the center of one side to the center of the side opposite. Orifices 80 in the pipe ring were at an angle of 30 degrees with the vertical in the underside of the ring and were inclined toward the walls of hood 60. Receptacle 81 around the pipe ring provided a ¼ inch space for contact material to collect in.

In operation, 350 tons per hour of catalyst were passed into the upper end of hood 60 and downwardly into the feed column therein. Of this amount about 280 tons per hour passed through high velocity region 73, while about 70 tons per hour passed through low velocity region 74. Liquid charge was supplied to spray ring 66 at the rate of 6,000 barrels per day. Of this, 3,000 barrels per day were injected into region 73 while the other 3,000 barrels per day were recycled to be cooled. The contact material from the feed column was passed onto the surface of a reaction bed of contact material and 12,000 barrels per day of a vaporized charge were also supplied to the bed.

In some forms (e.g., that of Figure 2), this invention may be operated so that vapor formed from the liquid is rapidly disengaged from the feed column and passed to the main body of the reaction bed separately of contact material. When so operated the process or apparatus may fall under the claims of United States patent application Serial Number 535,705, filed October 28, 1955. Of course, in other forms the instant invention does not employ the operation of said application.

It should be understood that it is intended to cover herein all changes and modifications of the examples of the invention herein chosen for purposes of disclosure which do not constitute departures from the spirit and scope of the invention.

We claim:

1. In a continuous process for the conversion of liquid hydrocarbons in the presence of a downwardly moving mass of granular contact material within a confined conversion zone, the improved method of supplying liquid hydrocarbons to said mass, which comprises: supplying contact material at a temperature suitable to convert said hydrocarbons to the upper section of said moving mass as a downwardly gravitating, laterally confined, substantially compact stream of substantially less horizontal cross-sectional area than said moving mass; maintaining within said stream across its horizontal cross-section a region of high velocity contact material flow and a region of substantially lower velocity contact material flow, said high velocity region carrying at least 60 percent of the contact material supplied to said mass but having a horizontal cross-sectional area less than 50 percent of the horizontal cross-sectional area of said stream; injecting a liquid hydrocarbon charge only into said high velocity region, at a rate within the range 350 to 875 gallons per hour per foot of stream circumference at the lower end of said stream and said rate also within the range 175 to 350 gallons per hour per square foot of horizontal cross-sectional area of said stream at any level below the level of liquid injection, and permitting vapors formed from said liquid charge to expand into said lower velocity region, and passing hydrocarbons from said stream into said moving mass.

2. In a continuous process for the conversion of liquid hydrocarbons in the presence of a downwardly gravitating, substantially compact bed of granular contact material within a confined conversion zone, the improved method of supplying liquid hydrocarbons to said bed, which comprises: supplying contact material at a temperature suitable to convert said hydrocarbons to the conversion zone as a downwardly gravitating, laterally confined, substantially compact stream of substantially less horizontal cross-sectional area than said bed; deflecting the contact material in said stream so as to divide said stream across its horizontal cross-section into a region of high velocity flow and a region of substantially lower velocity flow, said high velocity region carrying at least 60 percent of the contact material supplied to said mass but having a horizontal cross-sectional area less than 50 percent of the horizontal cross-sectional area of said stream; injecting a liquid hydrocarbon charge only into said high velocity region at a rate which is within the range about 350 to 875 gallons of charge per hour per foot of stream circumference at the lower end of said stream and also within the range about 175 to 350 gallons per hour per square foot of stream horizontal cross-sectional area; permitting vapors formed from said liquid hydrocarbons to expand from said high velocity region into said lower velocity region of said stream; passing contact material from said stream to the upper section of said bed; and passing hydrocarbons from said stream into said bed.

3. A continuous process for the conversion of liquid hydrocarbons in the presence of a downwardly gravitating, substantially compact bed of granular contact material, which comprises; maintaining said bed within a confined conversion zone; supplying contact material at a temperature suitable for the desired conversion to the upper section of said conversion zone as a downwardly gravitating, laterally confined, substantially compact stream of substantially less horizontal cross-section than said bed; deflecting the flow of contact material in said stream so as to divide said stream across its horizontal cross-section into an annular peripheral region of high velocity contact material flow and a central region of substantially lower velocity contact material flow, said high velocity region carrying at least 60 percent of the contact material supplied to said mass but having a horizontal cross-sectional area less than 50 percent of the horizontal cross-sectional area of said stream; injecting liquid hydrocarbon charge only into the high velocity region at a rate which is within the range about 350 to 875 gallons of charge per hour per foot of stream circumference at the lower end of said stream and also within the range about 175 to 350 gallons per hour per square foot of stream horizontal cross-sectional area; permitting vapors formed from the liquid charge in the high velocity region to expand into the low velocity region; passing contact material from said stream onto the upper surface of said bed, said central region of said stream supplying the central portion of said bed amounting to only a small fraction of the total horizontal cross-sectional area of said bed and said annular high velocity region supplying the annular portion of said bed around the central portion of said bed and said annular portion of said bed constituting the major portion of the horizontal cross-sectional area of said bed; passing hydrocarbons from said stream into said bed; causing contact material to flow downwardly through said bed at a substantially uniform rate all across the bed cross-section; passing the hydrocarbons downwardly through at least a portion of said bed to effect the desired conversion; removing products of conversion from the lower section of said bed and removing contact material from the lower section of said bed.

4. A continuous process for the conversion of liquid hydrocarbons in the presence of a downwardly gravitating, substantially compact column of granular contact material, which comprises: maintaining said bed within a confined conversion zone; supplying contact material at a temperature suitable for the desired conversion to a restricted area of the upper surface of said bed as a downwardly gravitating, laterally confined, substantially compact stream of substantially less horizontal cross-sectional area than said bed; confining the upper surface of said bed from the area of supply of said contact material at angles with the horizontal greater than the angle of repose of the contact material by means of downwardly and outwardly sloping solid surfaces whereby a portion of the contact material from said stream expands outwardly under said solid surfaces to supply the regions of said bed laterally removed from the area of supply of the contact material; deflecting the flow of the contact material in said stream so as to divide said stream across its horizontal cross-section into a region of high velocity contact material flow and a region of substantially lower velocity contact material flow, said high velocity region carrying at least 60 percent of the contact material supplied to said mass but having a horizontal cross-sectional area less than 50 percent of the horizontal cross-sectional area of said stream; injecting liquid hydrocarbon charge only into said high velocity region at a rate within the range 350 to 875 gallons per hour per foot of circumference of the lower end of said stream and also within the range 175 to 350 gallons per hour per square foot of stream horizontal cross-sectional area at any level below the level of liquid injection; permitting the vapors formed from said charge in said high velocity region to expand into said lower velocity region; passing hydrocarbons from said stream into said bed and downwardly therethrough to effect the desired conversion, removing products of conversion from the lower section of said bed and removing contact material from the lower section of said bed.

5. A continuous process for the conversion of liquid hydrocarbons in the presence of a moving mass of granular contact material, which comprises: maintaining a downwardly gravitating, substantially compact column of granular contact material within a confined conversion zone, said column being of substantial horizontal cross-sectional area; withdrawing contact material uniformly from the lower section of said column to promote downward flow of the contact material particles in said column at a uniform linear velocity all across the column cross-section; supplying contact material at a temperature suitable to convert said hydrocarbons to the upper end of said column as a single vertical compact confined stream extending upwardly from a central portion of the bed cross-section which amounts to only a minor fraction of the total horizontal bed cross-section, whereby a peripheral high velocity region of flow is formed in the confined stream, which region feeds the portion of the column surrounding said central portion and a central low velocity region is also formed within said stream; supplying liquid hydrocarbon charge only to said high velocity region at a level where said high velocity region carries at least 60 percent of the contact material to be supplied to said column and the horizontal cross-sectional area of the high velocity region is less than 50 percent of the total stream horizontal cross-sectional area, whereby vapors formed from said liquid charge may expand into said low velocity region, passing the hydrocarbon charge downwardly from said stream into said column and downwardly through said column to effect the desired conversion; maintaining the rate of supply of said liquid charge within the range about 350 to 875 gallons of charge per hour per foot of stream circumference at the lower end of said stream and also within the range 175 to 350 gallons per hour per square foot of stream horizontal cross-sectional area and removing the products of conversion from the lower section of said column.

6. The process of claim 5 further limited to supplying liquid hydrocarbon charge to a ring-shaped passage annularly about said contact material supply stream, and discharging liquid inwardly from said passage as a plurlity of stream directed into said high velocity region from a plurality of points around the outer periphery of said high velocity region.

7. A continuous process for the conversion of liquid hydrocarbons in the presence of a moving mass of granular contact material, which comprises; maintaining a downwardly gravitating, substantially compact bed of granular contact material within a confined conversion zone, said bed being of substantial horizontal cross-sectional area, supplying contact material at a temperature suitable to convert said hydrocarbons to a central area of the upper surface of said bed through a single vertical compact feed column, said feed column and said central area both being of substantially smaller horizontal cross-sectional area than the horizontal cross-sectional area of said bed; creating a region of high velocity contact material flow of cross-sectional area less than 50 percent of the cross-sectional area of said feed column at a level within the range about 12 to 18 inches above the lower end of said column, through which region at least 60 percent of the contact material flows; injecting a liquid hydrocarbon charge into said high velocity region at a rate which is within the range about 350 to 875 gallons of charge per hour per foot of column circumference at the lower end of the column and also within the range about 175 to 350 gallons per hour per square foot of column horizontal cross-sectional area; permitting the vapors formed from said liquid charge to expand into a region of lower velocity catalyst flow maintained in the central portion of said column at a level below the level of liquid injection; continuing the flow of most of the contact material in said column downwardly through a peripheral high velocity region surrounding said low velocity region; expanding the contact material from the peripheral region across the annular portion of the bed surrounding the central portion thereof which is directly below said column, passing the hydrocarbon charge into said bed to effect the desired conversion; removing the products of conversion from the lower section of said bed and removing contact material from the lower section of the bed.

8. A continuous process for the conversion of fluid hydrocarbons in the presence of a moving mass of granular contact material, which comprises: maintaining a downwardly gravitating, substantially compact bed of granular contact material within the lower section of a confined conversion zone; gravitating a substantially compact stream of contact material at a temperature suitable for the desired conversion centrally into the upper section of the conversion zone; expanding said stream outwardly to form a downwardly gravitating, substantially compact feed column of contact material of greater horizontal cross-sectional area than said stream but of horizontal cross-sectional area only a minor fraction of the horizontal cross-sectional area of said bed; baffling the flow of contact material in said feed column to divide said feed column into a peripheral region of high velocity contact material flow through which at least 60 percent of the total contact material flow to said column passes and a central region of substantially lower velocity contact material flow; injecting liquid hydrocarbon charge only into said high velocity region at a plurality of horizontally spaced-apart points on a common level in said high velocity region, the level of liquid injection being at a height above the lower end of said feed column within the range about 12 to 18 inches above the lower end of said feed column and the horizontal cross-sectional area of said high velocity region at the level of liquid injection being less than 50 percent of the total horizontal cross-sectional area of said feed column, said liquid being injected at a rate within the range about 350 to 875 gallons per hour per foot of circumference of the lower end of said column and also within the range 175 to 350 gallons per hour per square foot of column horizontal cross-section at any level below the level of liquid injection; permitting vapors formed from said liquid charge to expand from said high velocity region into said low velocity region; gravitating contact material from said feed column onto the upper surface of said bed, said central region of said column supplying the central portion of said bed amounting to only a small fraction of the total horizontal cross-sectional area of said bed and the contact material from said annular region supplying the annular portion of said bed around said central region by expanding outwardly in free surface flow across the upper surface of said bed; passing hydrocarbons from said feed column into said bed; passing a separate vaporized hydrocarbon charge into the upper section of said bed; passing both hydrocarbon charges downwardly through said bed to effect the desired conversion thereof; removing the products of conversion from the lower section of said bed and removing granular contact material from the lower section of said bed to promote downward movement of contact material through said bed at a substantially uniform velocity across said bed.

9. A continuous process for the conversion of fluid hydrocarbons in the presence of a moving mass of granular contact material, which comprises: maintaining a downwardly gravitating, substantially compact bed of granular contact material within a confined conversion zone; supplying contact material at a temperature suitable to convert said hydrocarbons to said bed by means of a substantially compact feed column extending upwardly from a central area on the upper surface of said bed amounting to only a minor fraction of the horizontal cross-sectional area of said bed; confining the upper surface of said bed from the area covered by said column at angles with the horizontal greater than the angle of repose of the contact material by means of solid surfaces sloping downwardly and outwardly from the area covered by said column; supplying contact material at a temperature suitable for the desired conversion to the upper end of said feed column as a confined stream of less horizontal cross-sectional area than said feed column; confining the upper surface of said feed column from the area of supply of said stream by means of solid surfaces sloping downwardly and outwardly at angles with the horizontal greater than the angle of repose of the contact material; baffling the flow of contact material in said feed column to form, at a level 12 to 18 inches above the lower end of said column, a peripheral region of high velocity contact material flow carrying at least 60 percent of the contact material to be supplied to said bed but having a horizontal cross-sectional area less than 50 percent of the total horizontal cross-sectional area of said column and a central region of substantially lower velocity contact material flow, injecting a liquid hydrocarbon charge only into said high velocity region, at a rate within the range 350 to 875 gallons per hour per foot of circumference of the lower end of said column and also within the range 175 to 350 gallons per hour per square foot of column cross-sectional area at any horizontal level below the level of liquid injection; permitting vapors formed from said liquid charge to expand into said lower velocity region; passing contact material from said lower velocity region of said column to a central area of the upper end of said bed amounting to only a small fraction of the horizontal cross-sectional area of said bed; passing contact material from said high velocity region of said column outwardly under the confining surfaces on said bed to supply the remainder of the bed about said central area; expanding hydrocarbons from said column into said bed; supplying a separate vaporized hydrocarbon charge to the upper section of said bed at a plurality of spaced-apart points lying on a common level within said bed below the lower end of the solid surfaces confining the upper end of said bed; passing all the hydrocarbons supplied to said bed downwardly therethrough to effect the desired conversion; removing products of conversion from the lower section of said bed; removing granular contact material from the lower section of said bed to promote downward movement of the contact material particles through said bed at a uniform rate across the horizontal cross-section of said bed.

10. An apparatus for the continuous conversion of fluid hydrocarbons in the presence of a moving mass of granular contact material, which comprises in combination: an enclosed conversion chamber adapted to confine a substantially compact, downwardly gravitating bed of granular contact material, the upper section of said chamber being of substantially less horizontal cross-sectional area than the main body of said chamber therebelow, a hollow, frusto-conical member with sides at an angle with the horizontal within the range about 40 to 65 degrees connecting the lower end of said upper section of said chamber with the upper end of the main body of said chamber, a conical roof on the upper end of the upper section of said chamber having sides at angles with the horizontal within the range about 40 to 65 degrees, a contact material supply conduit extending centrally into the upper end of the upper section of said conversion chamber, a plurality of vertically spaced-apart inverted hollow, frusto-conical baffles symmetrically within the upper section of said chamber, the diameter of the upper ends of said baffles being a major fraction of the diameter of said upper section of said chamber so that an annular space less than 8 inches wide is defined between said baffles and the walls of the upper section of said chamber, means for injecting liquid hydrocarbon charge into said space, means for removing the products of conversion from the lower section of said conversion chamber and means for removing contact material from the lower section of said chamber.

11. An apparatus for the continuous conversion of fluid hydrocarbons in the presence of a moving mass of granular contact material, which comprises in combination: an enclosed conversion chamber adapted to confine a substantially compact, downwardly gravitating bed of granular contact material, the upper section of said chamber being of substantially less horizontal cross-sectional area than the main body of said chamber therebelow, a hollow, frusto-conical member with sides at an angle with the horizontal within the range about 40 to 65 degrees connecting the lower end of said upper section of said chamber with the upper end of the main body of said chamber, a conical roof on the upper end of the upper section of said chamber having sides at angles with the horizontal within the range about 40 to 65 degrees, a contact material supply conduit extending centrally into the upper end of the upper section of said conversion chamber, a baffle placed symmetrically within said upper section of said chamber, said baffle having a conical upper section, a cylindrical central section and an inverted conical lower section, and said central section being of a size such that there is a uniform spacing between said central section of said baffle and the walls of the upper section of said chamber amounting to less than 8 inches whereby an annular passageway for contact material flow is formed, means for injecting a liquid hydrocarbon charge into said annular passgeway at a plurality of points on a common level less than 6 inches above the lower end of the cylindrical section of said baffle, means for removing the products of conversion from the lower section of said chamber and means for removing granular contact material from the lower section of said chamber.

12. An apparatus for the injection of liquid hydrocarbons into moving contact material masses, which comprises in combination: members defining an annular-shaped passageway for liquid hydrocarbons with a plurality of spaced-apart orifices through its underside, means for supplying liquid hydrocarbons to said passageway, members defining a receptacle around said annular passageway extending from a level above said orifices to a level adjacent the top of said passageway, the bottom of said receptacle fitting tightly to the outside of said passageway whereby a stagnant mass of contact material will be maintained within said receptacle around said passageway when the apparatus is imbedded in a moving contact material mass, said stagnant mass acting as a heat insulator between the liquid within said passageway and the moving contact material mass.

13. An apparatus for the injection of liquid hydrocarbons into moving compact beds of granular contact material, which comprises in combination: a pipe ring with a plurality of spaced-apart orifices through its underside, the wall thickness of said pipe ring being reduced in the areas adjacent said orifices, a ring-shaped receptacle around said pipe ring, said receptacle being of greater lateral dimensions than said pipe, so that a space is provided between said pipe and the walls of said receptacle and said receptacle extending from a bottom tightly fitted to said pipe at a level above said orifices to a level adjacent the top of said pipe whereby an insulating layer of contact material may be provided within said receptacle around said pipe, and means for supplying liquid hydrocarbons, air and steam to said pipe ring as desired at controlled rates.

References Cited in the file of this patent

UNITED STATES PATENTS

| | | |
|---|---|---|
| 1,676,389 | Fletcher | July 10, 1928 |
| 2,289,351 | Dixon et al. | July 14, 1942 |
| 2,701,788 | Schutte | Feb. 8, 1955 |
| 2,736,686 | Weber | Feb. 28, 1956 |
| 2,742,410 | Schutte | Apr. 17, 1956 |
| 2,767,129 | Watson | Oct. 16, 1956 |
| 2,771,406 | Ray | Nov. 20, 1956 |
| 2,799,625 | Drew | July 6, 1957 |